United States Patent
An et al.

(10) Patent No.: US 11,400,431 B2
(45) Date of Patent: Aug. 2, 2022

(54) COMPOSITION FOR SOFT ANTI-RELEASE MOISTURE ABSORBENT

(71) Applicant: TKENS, CO., LTD., Gyeryong-si (KR)

(72) Inventors: Kwang Ho An, Gyeryong-si (KR); Young Chin Chung, Daejeon (KR)

( * ) Notice: Subject to any disclaimer, the term of this patent is extended or adjusted under 35 U.S.C. 154(b) by 31 days.

(21) Appl. No.: 16/932,884

(22) Filed: Jul. 20, 2020

(65) Prior Publication Data

US 2021/0121849 A1    Apr. 29, 2021

(30) Foreign Application Priority Data

Oct. 29, 2019    (KR) .................. 10-2019-0135675

(51) Int. Cl.
*B01J 20/04* (2006.01)
*B01J 20/24* (2006.01)
*B01J 20/26* (2006.01)

(52) U.S. Cl.
CPC ........... *B01J 20/046* (2013.01); *B01J 20/041* (2013.01); *B01J 20/24* (2013.01); *B01J 20/261* (2013.01)

(58) Field of Classification Search
None
See application file for complete search history.

(56) References Cited

U.S. PATENT DOCUMENTS

2018/0353931 A1* 12/2018 Hyung .................. B01J 20/046
2020/0324271 A1* 10/2020 Hyung .................. B01J 20/041

FOREIGN PATENT DOCUMENTS

| CN | 102745974 A | 10/2012 |
|---|---|---|
| CN | 105163845 A | 12/2015 |
| CN | 106552485 A | 4/2017 |
| CN | 106687198 A | 5/2017 |
| CN | 107469141 A | 12/2017 |
| CN | 108745323 A | 11/2018 |
| CN | 108927115 A | 12/2018 |
| CN | 109225120 A | 1/2019 |
| CN | 109847541 A | 6/2019 |
| EP | 3721984 A1 | 10/2020 |
| JP | 61-254248 A | 11/1986 |
| JP | 620551 B2 | 3/1994 |
| JP | 2019141846 | 8/2019 |
| JP | 2019-162818 A | 9/2019 |
| KR | 10-2004-0028969 | 4/2004 |
| KR | 10-0652903 | 11/2006 |
| KR | 10-2011-0064208 | 6/2011 |
| KR | 10-2014-0088368 | 7/2014 |
| KR | 10-2017-0005628 | 1/2017 |
| KR | 10-1760304 | 7/2017 |
| KR | 10-1825698 | 1/2018 |
| KR | 10-2018-0035187 | 4/2018 |
| KR | 10-2018-0076049 | 7/2018 |
| KR | 10-2019-0047171 | 5/2019 |
| WO | 2010/011016 A1 | 1/2010 |
| WO | 2015/159910 A1 | 10/2015 |

OTHER PUBLICATIONS

Zhang Wenqing et al., "Preparation and characteristics of complex humidity-controlling materials with CM", Ecology and Environmental Sciences, 2009, 18(3), pp. 874-879.
Zhao Dong-fang et al., "Effect of Mixed Moisture Absorbers on Quality of Stored Mushrooms in High Oxygen Modified Atmosphere", Packaging Engineering, vol. 33, No. 23, Dec. 2012.
Chung, T W et al., "Comparison between Random and Structured Packings for Dehumidification of Air by Lithium Chloride Solutions in a Packed Column and Their Heat and Mass Transfer Correlations", Ind. Eng. Chem. Res. 1996, 35, 1, 192-198.
First Office Action of CN 201911119195 dated Jan. 7, 2022.

* cited by examiner

*Primary Examiner* — Joseph D Anthony
(74) *Attorney, Agent, or Firm* — Revolution IP, PLLC

(57) ABSTRACT

A moisture absorbent product prepared according to the present invention is characterized by adjusting a composition ratio of a metal chloride, a metal oxide, a cellulose derivative, and a lipid to a specific range, thereby suppressing corrosion, rust, external leakage of a product due to moisture release in an environment such as high temperature while maintaining a high moisture absorption rate, and minimizing a volume change due to moisture absorption. Thus, the moisture absorbent product can be usefully used as a moisture absorption product embedded in a vehicle lamp.

3 Claims, No Drawings

COMPOSITION FOR SOFT ANTI-RELEASE MOISTURE ABSORBENT

CROSS REFERENCE TO RELATED APPLICATION

The present application claims priority to Korean Patent Application No. 10-2019-0135675, filed Oct. 29, 2019, the entire contents of which is incorporated herein for all purposes by this reference.

TECHNICAL FIELD

The present invention relates generally to a composition for a soft anti-release moisture absorbent and a moisture absorbent product including the same. More particularly, the present invention relates to a composition for a soft anti-release moisture absorbent and a moisture absorbent product including the same, wherein a composition ratio of a metal chloride, a metal oxide, a cellulose derivative, and a lipid is adjusted to a specific range, so that the composition easily gelates with a high moisture absorption rate and a low release rate, thereby minimizing a volume change due to moisture absorption, and damage to a packaging material.

BACKGROUND

Moisture absorbents are placed in containers and used to absorb moisture inside the containers and to maintain objects stored in the container in good condition. These moisture absorbents are used to preserve moisture-sensitive products such as pharmaceuticals, food, semiconductors, and metal machinery.

A moisture absorbent is generally made by placing moisture-absorbing components in a packaging material and sealing the packaging material. The moisture absorptivity of the moisture absorbent is determined by the moisture absorptivity of the moisture-absorbing components in the packaging material, and it is also very important to manage moisture absorbed into the packaging material so as not to leak out.

In particular, as the automobile industry develops, problems of condensation in head lamps, rear lamps, and fog lights during transportation and storage of automobiles continue to occur, which leads to increasing industrial losses.

In a vehicle lamp, when the difference between inside temperature and outside temperature of parts is high in a high humidity environment such as in rainy weather, and in this state, when the temperature of a lamp lens is lowered, moisture inside the lamp condenses so that fine water droplets are formed on the inner surface of the lens, causing fogging. A light scattering phenomenon caused thereby becomes a major obstacle to safe driving of vehicles.

In an effort to solve this problem, a method in which an anti-fogging coating agent and a bentonite-based moisture absorbent are mounted in a lamp housing such as a dust cover has been used in the current automobile industry. However, the anti-fogging coating agent may undergo deterioration such as whitening or a flowing phenomenon due to outdoor ultraviolet rays, temperature, and humidity, and in this case, replacement of a vehicle lamp module is necessary. Additionally, a general bentonite-based absorbent re-releases moisture after absorbing a certain amount of moisture, in a high temperature and low humidity environment during operation of the lamp, causing condensation on the inner surface of the lamp lens.

Here, in a conventional moisture absorbent composed of only calcium chloride or magnesium chloride, moisture absorbency thereof is high, but after moisture absorption, an absorbed liquid may flow to cause a fatal problem to an object inside a container.

In an effort to compensate for this drawback, calcium chloride or magnesium chloride may be used in mixture with calcium oxide or magnesium oxide, which are raw materials for concrete. In this case, the moisture absorbent becomes concrete as the absorbent hardens during absorption. At this time, however, the volume of the moisture absorbent expands and excess absorbed moisture may remain in the liquid phase (deliquescent). Eventually, this liquid material may cause a leaking problem.

Furthermore, when the volume of the moisture absorbent in the container expands as the absorbed liquid increases, this may result that the inner wall of the container exerts pressure on the moisture absorbent due to limited space inside the container, thereby causing the liquid absorbed inside the moisture absorbent to leak out of a packaging material. Therefore, in order to solve this problem, a property that minimizes the expansion rate due to moisture absorption as in a sponge is necessary, and there is a need for a moisture absorbent having a new function in conjunction with this property.

The foregoing is intended merely to aid in the understanding of the background of the present invention, and is not intended to mean that the present invention falls within the purview of the related art that is already known to those skilled in the art.

DOCUMENTS OF RELATED ART (Patent document 1) Korean Patent Application Publication No. 10-2015-0058825 (published on May 29, 2015)

SUMMARY

Accordingly, the present invention has been made keeping in mind the above problems occurring in the related art, and an objective of the present invention is to provide a composition for a soft anti-release moisture absorbent and a moisture absorbent product including the same, wherein a composition ratio of a metal chloride, a metal oxide, a cellulose derivative, and a lipid is adjusted to a specific range, so that the composition easily gelates with a high moisture absorption rate and a low release rate, thereby minimizing a volume change due to moisture absorption, and damage to a packaging material.

In order to achieve the above objective, there is provided a composition for a soft anti-release moisture absorbent and a moisture absorbent product including the same.

The composition according to one aspect of the present invention includes: 30 to 70% by weight of a metal chloride; 20 to 50% by weight of a metal oxide; 1 to 10% by weight of a cellulose derivative having a degree of substitution of 0.1 to 3.0; and 5 to 20% by weight of a lipid.

The metal chloride may be any one or a plurality selected from calcium chloride, magnesium chloride, lithium chloride, strontium chloride, yttrium chloride, and copper chloride.

The metal oxide may be any one or a plurality selected from calcium oxide, barium oxide, magnesium oxide, strontium oxide, sodium oxide, and potassium oxide.

The cellulose derivative may be any one or a plurality selected from nitrocellulose, acetylcellulose, methylcellulose, ethylcellulose, benzylcellulose, carboxymethyl cellulose, and hydroxymethyl cellulose.

The lipid may be any one or a plurality selected from beeswax, lanolin, candelilla wax, petrolatum, polyethylene wax, polypropylene wax, polyamide wax, carnauba wax, paraffin wax, and polytetrafluoroethylene wax.

The moisture absorbent product including the composition may have a volume change rate of equal to or less than 120% measured under conditions of a temperature of 50° C. and a relative humidity condition of 95%, and may have a moisture release rate of equal to or less than 0.8% and a moisture absorption rate of equal to or greater than 160% measured under the conditions of the temperature of 50° C. and the relative humidity condition of 95%.

According to the moisture absorbent product prepared according to the present invention, by adjusting the composition ratio of the metal chloride, the metal oxide, the cellulose derivative, and the lipid to a specific range, it is possible to suppress corrosion, rust, external leakage of a product due to moisture release in an environment such as high temperature, while maintaining a high moisture absorption rate. Additionally, the moisture absorbent product is maintained in a gel state without hardening after moisture absorption, which makes it possible to minimize a volume change due to moisture absorption, and damage to the packaging material. Thus, the moisture absorbent product can be usefully used as a moisture absorption product embedded in a vehicle lamp.

DETAILED DESCRIPTION OF THE INVENTION

Hereinafter, a composition for a soft anti-release moisture absorbent according to the present invention and a moisture absorbent product including the same will be described in more detail with reference to Examples and Comparative Examples. However, the following specific examples are only a reference for describing the present invention in detail, and the present invention may be implemented in various forms without being limited thereto.

Therefore, the present invention is not limited to the specific examples presented below, but may be embodied in other forms, and the specific examples presented below are only described to clarify the spirit of the present invention and should not be construed as limiting the present invention.

Unless otherwise defined, the technologic and scientific terms used herein have the meanings generally understood by those skilled in the art, and functions and configurations known in the art that may make the gist of the present invention unclear are not described.

Further, the singular forms used in the specification and the appended claims are intended to include the plural forms as well, unless the context clearly indicates otherwise.

The technical term "anti-release" means that an absorbed liquid does not leak out.

The composition for the soft anti-release moisture absorbent according to the present invention is characterized by including a metal chloride, a metal oxide, a cellulose derivative, and a lipid.

In the present invention, the metal chloride absorbs moisture in the air on the basis of a high deliquescent property. The metal chloride may improve a rust prevention property in some cases, and a chloride of alkali metal or alkaline earth metal is mainly used.

Examples of the metal chloride include calcium chloride, magnesium chloride, lithium chloride, strontium chloride, yttrium chloride, and copper chloride, and these may be used alone or in mixture of two or more.

In the present invention, calcium chloride is more preferably included as the metal chloride. In general, the calcium chloride ($CaCl_2$) is present in the form of an anhydride or dihydrate, and has a property of generating heat of reaction when encountered with water. Additionally, the calcium chloride has an excellent deliquescent property compared to other metal chlorides, and thus is most preferable for the composition according to the present invention.

In the present invention, a preparation method of the metal chloride is not limited. However, the metal chloride has to be used in a dried state in order to have the deliquescent property, and thus a drying process has to be essentially included in a preparation process. In this case, detailed conditions of the drying process are not limited in the present invention, and drying is preferably carried out in an oven set at a temperature of equal to or greater than 150° C. Alternatively, vacuum drying, freeze drying, and the like may be used.

In the present invention, the preparation process of the metal chloride is not limited. As an example, the calcium chloride may be prepared by first calcining and hydrating dolomite to prepare calcium hydroxide and magnesium hydroxide, and then dissolving the calcium hydroxide and magnesium hydroxide in hydrochloric acid and removing a magnesium chloride component therefrom, as described in Korean Patent Application Publication No. 10-2018-0035187. Alternatively, the calcium chloride may be prepared by first reacting a slag generated in an ironmaking or steelmaking process with a hydrochloric acid solution to form a hydrochloride salt, and then separating other hydrochloride salts therefrom, as described in Korean Patent Application Publication No. 10-2011-0064208.

The metal chloride is preferably further mixed with a silicon compound. The silicon compound is capable of immobilize corrosion products such as metal ions and chlorine ions produced in a moisture absorbing process of the metal chloride, and thus a rust prevention effect may be greatly increased thereby.

In the present invention, the type of the silicon compound is not limited, but zeolite is preferably used. The zeolite, which is a crystalline aluminum silicate mineral, has a property of strongly adsorbing a polar substance by the action of a cation in a crystal structure and thus adsorbs not only the corrosion products but also moisture. In this case, through a certain size of micropores, molecules having a smaller size than the micropores are selectively passed and adsorbed.

In the present invention, the silicon compound may be prepared by first dissolving the metal chloride in water to prepare a solution, and then mixing a porous zeolite with the solution and spraying a resulting solution to form droplets having a predetermined average particle diameter, followed by drying to prepare a mixed moisture adsorption component of the metal chloride and silicon compound.

In the present invention, 100 to 500 parts by weight of the silicon compound is preferably added with respect to 100 parts by weight of the metal chloride. Within the above range, it is possible to exert a stable moisture adsorption ability and to greatly increase a rust prevention performance.

In the present invention, the metal chloride is preferably included in an amount of 30 to 70% by weight, more preferably 45 to 55% by weight, with respect to 100% by weight of the total composition. When the amount thereof is less than 30% by weight, the moisture adsorption performance may be greatly reduced. On the other hand, when the amount thereof is greater than 70% by weight, a liquefied corrosion product may be released due to excessive increase in deliquescence.

In the present invention, the metal oxide itself has a high deliquescent property to adsorb moisture and prevents initial liquefaction of magnesium chloride due to the reaction which will be described later.

Examples of the metal oxide include any one or a plurality selected from calcium oxide, barium oxide, magnesium oxide, strontium oxide, sodium oxide, and potassium oxide, and may be used alone or in mixture of two or more.

In the present invention, the metal oxide may be more preferably included as the magnesium oxide. The magnesium oxide forms an acicular hydration product and absorbs an initially liquefied metal chloride to maintain a solid shape.

In the present invention, the metal oxide is preferably included in an amount of 20 to 50% by weight, more preferably 30 to 40% by weight, with respect to 100% by weight of the total composition. When the amount thereof is less than 20% by weight, it may be difficult to control the high deliquescent property of the metal chloride, with the result that the rust prevention effect may be greatly reduced. On the other hand, when the amount thereof is greater than 50% by weight, moisture absorbency may be reduced due to a caking effect due to a rapid magnesia reaction.

In the present invention, the metal chloride or metal oxide is preferably included in powder form. In this case, the specific surface area of the metal chloride or metal oxide is not limited, but the BET specific surface area is preferably equal to or greater than 10 $m^2/g$, and more preferably equal to or greater than 40 $m^2/g$.

In the present invention, the cellulose derivative is included to compensate for disadvantages of the metal oxide or metal chloride. In a general moisture absorbent, a hydration product in an aqueous solution state produced by the metal oxide or metal chloride absorbing moisture may leak or be damaged. Therefore, by including a high molecular weight cellulose derivative in conjunction with the metal oxide and metal chloride to suppress this disadvantage of the hydration product, it is possible to secure moisture absorptivity of the cellulose derivative itself while preventing damage to a packaging material due to hardening of the metal oxide and metal chloride.

In particular, when the cellulose derivative is mixed with the metal chloride, more specifically, the calcium chloride, a water molecule adsorption rate may be increased. In more detail, when the calcium chloride comes into contact with water, calcium ions dissociate, and these calcium ions induce crosslinking between carboxymethyl cellulose molecules by binding to functional groups of the cellulose derivative, particularly carboxyl groups such as carboxymethyl cellulose. This increases the viscosity of the total composition and maintains gelation thereof so that the hydration product is held without leaking out. Additionally, a gel blocking phenomenon is reduced and thus the water molecule adsorption rate becomes faster.

Further, the cellulose derivative itself has electrostatic repulsion and hydrophilicity at the same time, and thus may have a certain level of dehumidifying property regardless of change in relative humidity.

In the present invention, examples of the cellulose derivative include nitrocellulose, acetylcellulose, methylcellulose, ethylcellulose, benzylcellulose, carboxymethyl cellulose, hydroxymethyl cellulose, and the like. Of these, the carboxymethyl cellulose is preferably used because the carboxymethyl cellulose itself has —COONa with electrostatic repulsion and —OH with hydrophilicity at the same time and thus may accommodate more water molecules with expansion between internal structures.

The cellulose derivative may have a degree of substitution of 0.1 to 3.0, preferably 0.1 to 1.5. When the degree of substitution satisfies the above range, gelation may proceed faster than when the carboxymethyl cellulose molecule comes into contact with moisture, and the viscosity of the total composition may be increased and a liquid hydration product may be prevented from leaking out.

In this case, the degree of substitution means a degree to which a hydroxy group of glucose constituting cellulose is substituted with a carboxymethyl group, and the degree of substitution when, on average, one out of three hydroxy groups in a cellulose molecule is substituted with a carboxymethyl group is defined as 1.

A preparation method of the cellulose derivative is not limited. As an example, a modified cellulose derivative may be prepared by esterifying or etherifying a part of hydroxy groups (—OH) in normal cellulose. Typical etherified cellulose derivatives are carboxymethyl cellulose (CMC), hydroxyethyl cellulose (HEC), hydroxypropyl cellulose (HPC), and the like, and typical esterified cellulose derivatives are nitrocellulose, cellulose acetate, and the like.

Further, the shape and the like of the cellulose derivative is not limited like the metal chloride or metal oxide. As an example, the cellulose derivative may be granular, and the average diameter thereof is preferably 0.1 to 20 μm.

The cellulose derivative is preferably included in an amount of 1 to 10% by weight, more preferably 3 to 7% by weight, with respect to 100% by weight of the total composition. When the amount thereof is less than 1% by weight, the rate of magnesia cement production in an initial moisture absorption process of the composition may be rapidly increased, with the result that a packaging material may be damaged. On the other hand, when the amount thereof is greater 10% by weight, the volume of the composition may be excessively increased during the moisture absorption process, with the result that the packaging material may be damaged.

In the present invention, when the temperature around the composition is changed, absorbed moisture may be released as the composition transitions from a solid to a liquid, and in this case, the lipid serves to prevent this by increasing the overall viscosity of the composition. Further, the lipid also has a lubricant effect to increase processability by reducing the viscosity of the composition.

In the present invention, the type of the lipid is not limited. As an example, the lipid may be any one or a plurality selected from beeswax, lanolin, candelilla wax, petrolatum, polyethylene wax, polypropylene wax, polyamide wax, carnauba wax, paraffin wax, and polytetrafluoroethylene wax. Of these, the polyethylene wax is preferably used for an anti-release effect of moisture and uniform dispersion of the composition.

In the present invention, the lipid is preferably included in an amount of 5 to 20% by weight, more preferably 5 to 15% by weight, with respect to 100% by weight of the total composition. When the amount thereof is less than 5% by weight, it may be difficult to prevent liquefaction of the composition due to temperature change. On the other hand, when the amount thereof is 20% by weight, phase separation between the lipid and other components may occur after hardening of the composition, resulting in a corrosion product.

The composition for the soft anti-release moisture absorbent according to the present invention may further include various kinds of additives. In detail, the additives may include a catalyst of a type known per se, a surface-active additive, an emulsifier, a reaction retarder, a pigment, a dye, a flame retardant, an anti-aging agent, a scorch inhibitor, a plasticizer, an antibacterial agent, a filler, and the like.

The amount of the additives is not limited, and the amount of each component may be freely controlled. As an example, each component of the additives is preferably included in an amount of 0.01 to 10 parts by weight with respect to 100 parts by weight of the total composition.

The present invention may provide a moisture absorbent product including the composition for the soft anti-release moisture absorbent. In detail, the moisture absorbent product may include a packaging material having an accommodating space therein, and the moisture absorbent sealed in the packaging material.

In the present invention, the packaging material may be a breathable film composed of one or multiple layers. As an example, the packaging material may have a double-layered structure in which a coating layer including synthetic latex is formed on the breathable film. In this case, thermal resistance of the breathable packaging material is good, which is preferred. In this case, the double-layered structure may be formed through a process of applying a coating solution including 30 to 40% by weight of synthetic latex, 2 to 10% by weight of an ethylene vinyl acetate (EVA) material, 50 to 60% by weight of a solvent, and 1 to 5% by weight of other materials on the breathable film by a known method, and after application of the coating solution, a drying process by a known method may also be performed, if necessary.

The synthetic latex for forming the coating layer is preferably an acrylic latex adhesive and/or acrylic latex resin, and more specifically, there is no particular limitation on the manufacturer as long as an appropriate manufacturer known to those skilled in the art is employed. The EVA material for forming the coating layer is preferably a hot melt adhesive including EVA, and an appropriate manufacturer known to those skilled in the art may also be employed. As a component of the coating liquid for forming the coating layer, other materials are a curing agent, an inorganic filler, and/or an additive resin. The curing agent may be, for example, at least one selected from the group consisting of an amine-based curing agent, an acid anhydride-based curing agent, a phenol-based curing agent, and a dicyandiamide-based curing agent. The inorganic filler may be, for example, at least one selected from the group consisting of calcium carbonate, magnesium carbonate, talc, mica, kaolin, graphite, and silica. The additive resin may be, for example, at least one selected from the group consisting of terpene-phenol resin, hydrogenated rosin, petroleum resin, xylene resin, and coumarone resin. As a component of the coating liquid for forming the coating layer, the solvent may be at least one selected from the group consisting of toluene, acetone, and methyl ethyl ketone.

The thickness of the coating layer is not limited in the present invention, but is preferably 1 to 50 μm, more preferably 5 to 10 μm.

In the breathable film of a packaging film of the breathable packaging material included in the moisture absorbent product according to the present invention, the breathable film may include at least one selected from the group consisting of Tyvek, polypropylene (PP) non-woven fabric, polyethylene (PE) non-woven fabric, polyethylene terephthalate (PET) non-woven fabric, paper, and cloth. In terms of providing good thermal resistance to the packaging material, a breathable film made of Tyvek is preferably used.

Accordingly, the packaging film of the breathable packaging material included in the moisture absorbent product according to the present invention may be a double-layered structure in which the coating layer is preferably formed on the breathable film made of Tyvek.

As a composition ratio of the metal chloride, the metal oxide, the cellulose derivative, and the lipid is adjusted to a specific range as described above, the moisture absorbent product prepared according to the present invention may have a volume change rate of equal to or less than 120% measured under conditions of a temperature of 50° C. and a relative humidity condition of 95%, and may have a moisture release rate of equal to or less than 0.8% and a moisture absorption rate of equal to or greater than 160% measured under the conditions of the temperature of 50° C. and the relative humidity condition of 95%.

Hereinafter, the present invention will be described in more detail with reference to Examples and Comparative Examples. However, the following Examples and Comparative Examples are only illustrative and not intended to limit the invention thereto.

The physical properties of specimens prepared through the following Examples and Comparative Examples were measured as follows.

(Sample)

The manufacturers of samples used in Examples and Comparative Examples are shown in Table 1 below.

TABLE 1

| Classification | Composition | Manufacturer | Product name | Remarks |
|---|---|---|---|---|
| A | Calcium chloride | Aldrich | STARMAG 50 | Purity 94% |
| B | Magnesium oxide | Daemyung Chemical Co., Ltd. | — | CAS. NO: 1309-48-4 |
| C | Carboxymethyl cellulose | Shinwon Chemical & Trading Corp. | — | CAS. NO: 9004-32-4 |
| D | Polyethylene wax | SFC | LH1200 | Softening point: 109 ± 3° C. |

(Moisture Absorption Rate)

After exposing a specimen to a temperature of 50±2° C. and a relative humidity of 95±5% for seven days using a thermohygrostat, each weight was measured every 24 hours and then substituted into Equation 1 below to calculate the moisture absorption rate.

$$\text{moisture absorption rate}(\%) = \frac{\text{weight after exposure} - \text{initial weight}}{\text{initial weight}} \times 100 \quad \text{[Equation 1]}$$

(Anti-Release Rate)

After the specimen absorbed moisture for 48 hours under a temperature of 23±2° C. and a relative humidity of 50±5%, the specimen was dried in an oven at 70±2° C. for two hours, and the moisture absorption rate of the specimen at each drying temperature was measured. That is, the initial and post-drying moisture absorption rates were respectively measured by performing initial moisture absorption and then performing drying, and the respective moisture absorption rates were substituted into Equation 2 below to calculate the anti-release rate. As an example, the anti-release rate of 90% means that 90% of initially absorbed moisture remains after drying.

$$\text{anti-release rate}(\%) = \frac{\text{moisture absorption rate after drying}}{\text{initial moisture absorption rate}} \times 100 \quad \text{[Equation 2]}$$

(Volume Change Rate)

The dimensions ($L_{wet}$) of specimens for each sample were measured under the same condition as measurement of the moisture absorption rate, and then the dimensions ($L_{dry}$) of initial specimens were measured. The measured dimensions were subjected into Equation 3 below to calculate the dimensional change (DC) according to moisture absorption.

$$DC = \frac{L_{wet} - L_{dry}}{L_{dry}} \times 100 \quad \text{[Equation 3]}$$

Examples 1 to 7, Comparative Examples 1 to 7

Moisture absorbents were prepared by uniformly mixing in composition ratios shown in Table 2 below. Subsequently, 35 g of each of the moisture absorbents of Examples 1 to 7 and Comparative Examples 1 to 7 was placed into a breathable packaging material having a length of 100 mm and a width 100 mm, and then the respective packaging materials were processed at a temperature of 120° C. using a heat-sealing machine, thereby preparing the specimens. In this case, a commercially available product (Desikhan, HM) was used as a specimen of Comparative Example 1. The physical properties of the prepared specimens were measured and described in Tables 3 to 4 below.

TABLE 2

| | Composition(% by weight) | | | |
|---|---|---|---|---|
| | A | B | C | D |
| Example 1 | 50 | 35 | 5 | 10 |
| Example 2 | 40 | 45 | 5 | 10 |
| Example 3 | 60 | 25 | 5 | 10 |
| Example 4 | 53 | 35 | 2 | 10 |
| Example 5 | 47 | 35 | 8 | 10 |
| Example 6 | 57 | 35 | 5 | 3 |
| Example 7 | 48 | 35 | 5 | 12 |
| Comparative Example 1 | Commercially available product (Desikhan, HM) | | | |
| Comparative Example 2 | 80 | 5 | 5 | 10 |
| Comparative Example 3 | 25 | 60 | 5 | 10 |
| Comparative Example 4 | 50 | 35 | — | 15 |
| Comparative Example 5 | 45 | 30 | 15 | 10 |
| Comparative Example 6 | 50 | 42 | 5 | 3 |
| Comparative Example 7 | 43 | 30 | 5 | 22 |

TABLE 3

| | Weight (g) | | | | | | | Moisture absorption rate (%) | Volume change rate (%) |
|---|---|---|---|---|---|---|---|---|---|
| | Initial | Day 1 | Day 2 | Day 3 | Day 4 | Day 5 | Day 7 | | |
| Example 1 | 36.91 | 56.16 | 68.27 | 76.39 | 83.34 | 88.84 | 96.81 | 162.3 | 119.5 |
| Example 2 | 36.54 | 52.24 | 62.51 | 69.58 | 72.10 | 79.97 | 85.83 | 134.9 | 119.6 |
| Example 3 | 36.93 | 56.18 | 68.53 | 76.40 | 84.11 | 89.27 | 97.54 | 164.1 | 119.3 |
| Example 4 | 36.92 | 56.18 | 67.52 | 75.34 | 82.07 | 85.65 | 94.27 | 155.3 | 119.2 |
| Example 5 | 36.54 | 56.20 | 67.80 | 75.19 | 81.92 | 85.52 | 94.30 | 158.1 | 119.7 |
| Example 6 | 36.53 | 56.02 | 67.49 | 75.27 | 81.36 | 85.12 | 93.96 | 157.2 | 119.5 |
| Example 7 | 36.54 | 56.08 | 67.54 | 75.14 | 81.55 | 85.31 | 92.42 | 152.9 | 120.1 |
| Comparative Example 1 | 36.85 | 57.83 | 69.66 | 75.31 | 79.49 | 82.34 | 86.97 | 136.0 | 122.4 |
| Comparative Example 2 | 36.51 | 49.22 | 65.47 | 69.54 | 73.30 | 75.21 | 79.20 | 116.9 | 95.3 |
| Comparative Example 3 | 36.51 | 47.22 | 62.47 | 65.54 | 67.30 | 69.21 | 70.20 | 92.3 | 119.2 |
| Comparative Example 4 | 37.10 | 55.24 | 61.65 | 64.16 | 67.12 | 68.98 | 69.42 | 87.1 | 119.1 |
| Comparative Example 5 | 37.14 | 57.88 | 70.24 | 77.14 | 83.10 | 87.54 | 95.24 | 156.4 | 147.2 |
| Comparative Example 6 | 36.52 | 56.07 | 67.51 | 75.28 | 81.31 | 85.16 | 93.85 | 157.0 | 98.2 |
| Comparative Example 7 | 36.54 | 56.05 | 67.48 | 75.29 | 81.35 | 85.14 | 93.90 | 157.0 | 97.5 |

As shown in the above Table 3, it can be seen that the moisture absorbents prepared according to the present invention can effectively absorb moisture in the air on the basis of a high deliquescent property. In detail, in Examples 1 and 3 in which the amount of the metal chloride maintained in an appropriate range, it can be seen that the moisture absorption rate was maintained at equal to or greater than 160% although the results varied slightly. However, in Example 2 in which metal oxide was added in a slight excess amount, it can be seen that the moisture absorption rate was relatively decreased. This is presumed to be due to rapid occurrence of condensation due to the magnesia reaction.

TABLE 4

| | Weight (g) | | | |
| --- | --- | --- | --- | --- |
| | Initial | Weight after moisture absorption | Weight after drying | Release rate (%) |
| Example 1 | 36.78 | 42.23 | 42.13 | 0.24 |
| Example 2 | 36.75 | 46.87 | 45.25 | 0.84 |
| Example 3 | 36.78 | 46.54 | 45.22 | 0.86 |
| Example 4 | 36.69 | 46.87 | 45.30 | 0.84 |
| Example 5 | 36.79 | 46.34 | 45.19 | 0.88 |
| Example 6 | 36.74 | 46.72 | 45.35 | 0.86 |
| Example 7 | 36.77 | 46.54 | 45.21 | 0.86 |
| Comparative Example 1 | 36.85 | 43.76 | 43.65 | 0.25 |
| Comparative Example 2 | 36.72 | 45.21 | 45.22 | 1.00 |
| Comparative Example 3 | 36.74 | 44.95 | 45.01 | 1.01 |
| Comparative Example 4 | 36.75 | 45.01 | 45.20 | 1.02 |
| Comparative Example 5 | 36.75 | 45.23 | 45.52 | 1.03 |
| Comparative Example 6 | 36.76 | 45.01 | 45.03 | 1.00 |
| Comparative Example 7 | 36.75 | 44.98 | 44.78 | 0.97 |

As shown in the above Table 4, the moisture absorbents prepared according to the present invention exhibited excellent anti-release rate. In particular, Example 1 in which the amounts of the metal chloride, the metal oxide, the cellulose derivative, and the lipid satisfied the present invention exhibited the most excellent anti-release rate. However, in Comparative Examples 2 to 7 in which the amount of the composition was out of a reference range, the anti-release rate was significantly reduced.

What is claimed is:

1. A composition for a soft anti-release moisture absorbent, the composition comprising:
   45 to 70% by weight of a calcium chloride;
   20 to 40% by weight of a magnesium oxide;
   1 to 10% by weight of a carboxymethyl cellulose having a degree of substitution of 0.1 to 3.0; and
   5 to 15% by weight of a lipid.

2. The composition of claim 1, wherein the lipid is any one or a plurality selected from beeswax, lanolin, candelilla wax, petrolatum, polyethylene wax, polypropylene wax, polyamide wax, carnauba wax, paraffin wax, and polytetrafluoroethylene wax.

3. The composition of claim 1, wherein a moisture absorbent product including the composition has a volume change rate of equal to or less than 120% measured under conditions of a temperature of 50° C. and a relative humidity condition of 95%, and has a moisture release rate of equal to or less than 0.8% and a moisture absorption rate of equal to or greater than 160% measured under the conditions of the temperature of 50° C. and the relative humidity condition of 95%.

* * * * *